Jan. 2, 1951  G. E. DATH  2,536,266
SHOCK ABSORBER FOR RAILWAY CAR TRUCKS
Filed Feb. 25, 1949

Inventor:
George E. Dath.
By Henry Fuchs.
Atty.

Patented Jan. 2, 1951

2,536,266

UNITED STATES PATENT OFFICE 2,536,266

SHOCK ABSORBER FOR RAILWAY CAR TRUCKS

George E. Dath, Mokena, Ill., assignor to W. H. Miner, Inc., Chicago, Ill., a corporation of Delaware Application February 25, 1949, Serial No. 78,329

4 Claims. (Cl. 267—9)

1

This invention relates to improvements in friction shock absorbers especially adapted as snubbing devices for dampening the action of railway car truck springs.

One object of the invention is to provide a friction shock absorber of simple design, for dampening the action of truck springs of railway cars, comprising a friction casing, a pair of friction shoes slidingly telescoped within the casing, and a rubber element for spreading the shoes apart, wherein the shoes are carried by a follower relatively movable toward and away from the casing, one of the shoes being anchored to the follower for movement in unison therewith, and the other shoe being movably connected to the follower and actuated during the last part of the compression stroke of the device to move relatively to said other shoe and follower and effect distortion of said rubber element to increase the frictional resistance during the last part of the compression stroke.

Other objects of the invention will more clearly appear from the description and claims hereinafter following.

Figure 1:
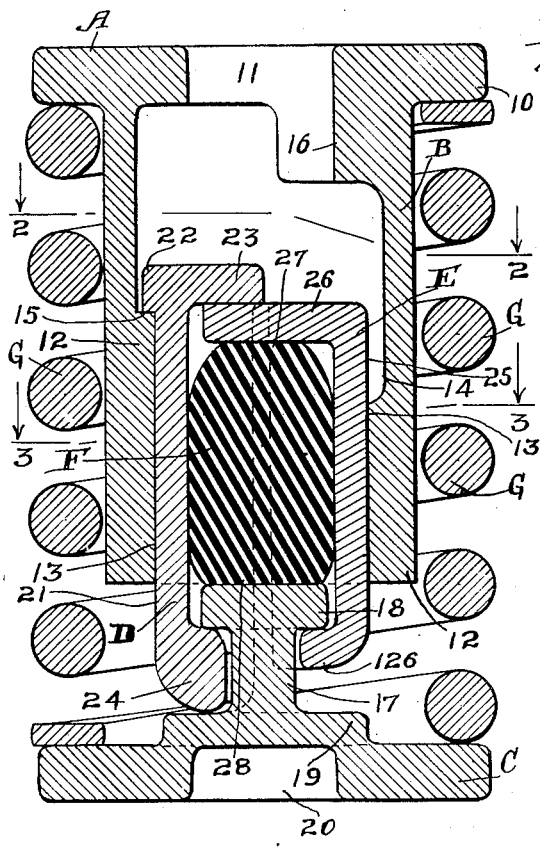
Figure 2:
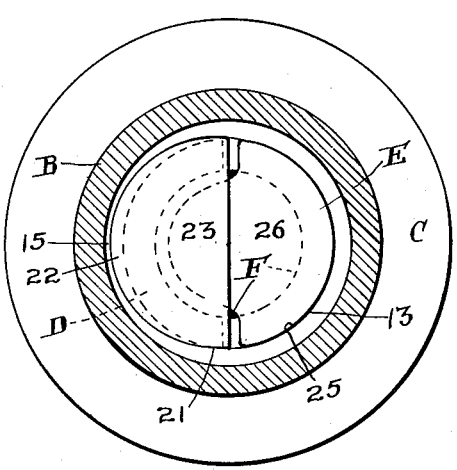
Figure 3:
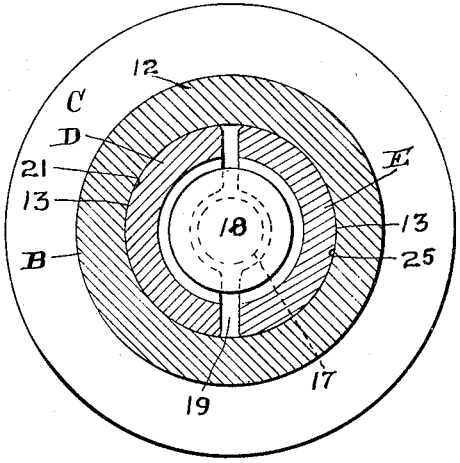
Figure 4:
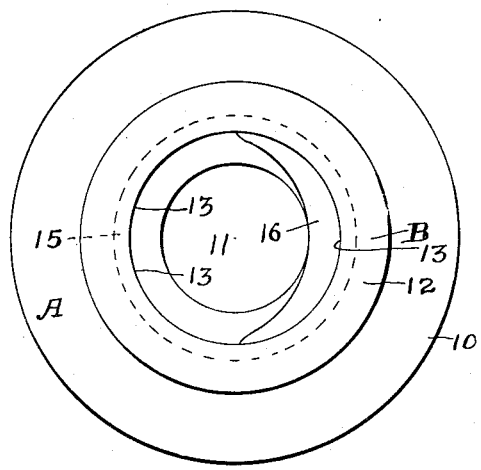

In the accompanying drawing forming a part of this specification, Figure 1 is a vertical sectional view of the improved shock absorber. Figure 2 is a horizontal sectional view, corresponding substantially to the line 2—2 of Figure 1. Figure 3 is a horizontal sectional view, corresponding substantially to the line 3—3 of Figure 1. Figure 4 is a bottom plan view of the friction casing illustrated in Figure 1.

My improved shock absorber, as illustrated in the drawing, comprises broadly a top follower A; a friction casing B formed rigid with the top follower; a bottom follower C; a pair of friction shoes D and E slidingly telescoped within the casing B, the shoe D being anchored to the follower C; a rubber block F under compression between the shoes; and a coil spring G surrounding the casing B and bearing at its top and bottom ends on the followers A and C.

The follower A is in the form of a circular disclike plate, having the friction casing B formed integral therewith and depending therefrom. The casing B is in the form of a cylindrical tubular member, open at its lower end and partly closed at its upper end, the follower A forming the top end wall of said casing.

As shown in Figures 1 and 4, the follower A projects laterally outwardly from the casing B, thereby providing an annular follower flange 10 at the upper end of the casing. The follower A is provided with a central opening 11 therethrough, adapted to accommodate the usual centering projection, not shown, of the top spring plate of a truck spring cluster of a railway car.

The casing B has the side wall thereof inwardly thickened at its lower end, as shown most clearly in Figure 1, to provide a friction shell section 12, presenting an interior, cylindrical friction surface 13.

At the right hand side of the casing B, the friction surface 13 is cut away at its inner end, as indicated at 14, so that the shoe E projects beyond the upper end of the same when the mechanism is fully expanded. The inner end of the inwardly enlarged portion of the side wall of the casing B provides a transverse stop shoulder 15 at the left hand side of the casing at the inner end of the friction surface 13, with which the shoe D has shouldered engagement to limit upward movement of the casing B with respect to said shoe.

The side wall of the casing B at the right hand side thereof, as seen in Figure 1, is inwardly enlarged or thickened at the upper end portion of the casing to provide a luglike projection 16 for actuating the shoe E.

The bottom follower C is in the form of a cylindrical disclike plate of the same outside diameter as the follower A. The follower C is formed with an upstanding central lug 17 in the form of a short cylindrical post having a laterally projecting, annular flange at its upper end forming a head 18. The lug 17 is formed on an upstanding central boss 19 on the follower C. The follower C is further provided with an outwardly opening, central seat 20, adapted to accommodate the usual spring centering projection, not shown, of the bottom spring plate of the truck spring cluster.

The shoe D is in the form of a transversely curved plate of substantially semi-cylindrical, transverse cross section and presents a lengthwise extending, transversely curved friction surface 21 on its outer side, which is in sliding engagement with the interior friction surface 13 of the casing, at the left hand side of the mechanism, as seen in Figure 1. At the upper end, the shoe D has a laterally outwardly projecting stop flange 22 overhanging the stop shoulder 15 of the casing B to limit longitudinal separation of the casing and this shoe. On the inner side of the shoe D, at the upper end thereof, is a horizontally extending flange 23, which is in transverse alignment with the flange 22. At the lower end thereof, the shoe D is provided with a relatively heavy, inturned flange 24, which is engaged beneath the head 18 of the lug 17 and fits between said head and the boss 19 of the bottom follower C to anchor the shoe D to the follower.

The shoe E is also in the form of a transversely curved plate of semi-cylindrical cross section and presents a lengthwise extending, transversely curved friction surface 25 on its outer side, which is slidingly engaged with the interior friction surface 13 of the casing B at the right hand side of the mechanism, as seen in Figure 1. At the upper end, the shoe E is provided with a horizontal, laterally inwardly projecting flange 26 engaged beneath the flange 23 of the shoe D. The shoe E is shorter than the shoe D and has its lower end spaced from the boss 19 of the follower C in the expanded condition of the mechanism. An inturned stop flange 126 at the bottom end of the shoe D, which is engaged beneath the head 18 of the lug 17, limits upward displacement of the shoe E.

The rubber block F is in the form of an elongated, cylindrical plug. The block F is interposed between the shoes D and E and has flattened top and bottom end faces 27 and 28 bearing respectively on the underneath side of the flange 26 of the shoe E and the top side of the head 18 of the lug 17 of the bottom follower C. The block F is under initial compression between the shoes D and E and holds the same spread apart in tight frictional contact with the friction surface 13 of the casing B.

The spring G comprises a relatively heavy helical coil surrounding the casing B and bearing at its top and bottom ends, respectively, on the underneath side of the top follower A and the top side of the bottom follower C. This spring is preferably under initial compression.

In assembling the mechanism, with the casing B supported in inverted position, that is, with the follower A resting on a support and the casing upstanding therefrom, the spring G is placed over the casing B in position resting on the follower A. The assembled unit, comprising the two shoes D and E and the block F, in inverted position, is then engaged within the open end of the casing B, the shoe D being tilted inwardly at its outer end to permit the flange 22 thereof to freely enter the casing. The mechanism is then forcibly compressed to telescope the shoes D and E within the casing B and force the same inwardly of said casing until the stop flange 22 passes the shoulder 15 of the casing and snaps in back of the same to interlock the parts against lengthwise separation.

As will be understood by those familiar with this art, my improved shock absorber is substituted for one or more of the spring units of a cluster of truck springs of a railway car and cooperates with the top and bottom spring follower plates of such a cluster.

In the operation of my improved shock absorber, upon the springs of the cluster of the truck of a railway car being compressed, the casing B is forced downwardly with the top spring follower plate of the cluster, toward the bottom follower C, thereby sliding the shoes inwardly of the casing, opposed by the spring G, thus snubbing the action of the truck springs. As compression of the shock absorber progresses, the lug 16 of the casing B comes into contact with the shoe E, forcing the same downwardly in unison with the casing and compressing the rubber block F in lengthwise direction against the lower follower C, causing the block to spread radially and placing the shoes D and E under progressively increasing additional pressure. The frictional resistance between the shoe D and casing B is thus greatly increased during the last part of the compression stroke of the mechanism, thereby correspondingly increasing the snubbing capacity of the same. Compression of the shock absorber is positively limited by engagement of the lower end of the casing B with the follower C.

Upon recoil of the truck springs, the actuating pressure on the follower A is reduced, thus permitting the return of the parts to the normal position shown in Figure 1, by the expansive action of the spring G and the resilient rubber block F.

I claim:

1. In a shock absorber, the combination with a friction casing; of a pair of friction shoes slidingly telescoped within the casing; a follower, said casing and follower being relatively movable toward and away from each other lengthwise of the mechanism; one of said shoes being anchored to the follower and held against relative lengthwise movement with respect to said follower; and the other shoe being movable lengthwise with respect to said follower; yielding means between said follower and casing opposing lengthwise movement of said follower and casing toward each other; a rubber block interposed between said shoes; said block being under lateral compression between said shoes, and bearing at opposite ends on said follower and shoe which is movable with respect to said follower for opposing relative movement of said follower and last named shoe toward each other; and a shoulder on said casing engageable with said last named shoe after compression of the mechanism to a predetermined extent for moving said shoe toward said follower to compress said resilient rubber means lengthwise and expand the same laterally against said shoes.

2. In a shock absorber, the combination with an end follower; of a second end follower having a retaining lug thereon, said followers being movable toward each other lengthwise of the mechanism; a friction casing projecting from said first named follower toward said second named follower; a friction shoe having a flange in locking engagement between said second named follower and the retaining lug thereof; a second friction shoe movable toward and away from said second named follower, said shoes being slidingly telescoped within the casing; a rubber element interposed between said shoes and opposing relative movement of said second named shoe and second named follower toward each other, said rubber element being under lateral compression between said shoes for holding the latter spread apart; yielding means between said followers opposing movement of said followers toward each other; and means on said casing engageable with said second named shoe after compression of the mechanism to a predetermined extent for moving said second named shoe lengthwise with respect to said second named follower, compressing said rubber element in lengthwise direction.

3. In a shock absorber, the combination with a follower at one end of the mechanism; of a second follower at the other end of the mechanism, said followers being relatively movable toward and away from each other; a friction casing projecting from said first named follower, said casing being rigid with said follower; an inwardly extending lug on said second named follower, said lug having a head at its outer end; a friction shoe having a retaining flange at its outer end engaged and fitting between said second named follower and head of the lug thereof; a second friction shoe, said shoes being slidingly telescoped within the casing, said second named shoe being movable lengthwise with respect to said second named follower; a rubber pad under lateral compression interposed between said shoes, said pad bearing at one end on said head of the lug of said second named follower; an inturned flange at the inner end of said second named shoe bearing on the other end of said rubber pad; an interior shoulder on said casing engageable with said second named shoe after compression of the mechanism to a predetermined extent for forcing said second named shoe lengthwise toward said second named follower to compress said pad in lengthwise direction; and spring means between said followers yieldingly opposing relative movement of said followers toward each other.

4. In a shock absorber, the combination with a follower having a post projecting therefrom, said post having an annular retaining flange at its outer end; of a friction casing, said casing and follower being relatively movable toward and away from each other; a pair of friction shoes slidingly telescoped within the casing, each of said shoes having a retaining flange at its outer end engaged in back of said retaining flange of the post, one of said shoes having the outer end thereof engaged with said follower and the other of said shoes having the outer end thereof normally spaced from said follower, said last named shoe having an inturned abutment flange at its inner end; an interior lug on said casing normally spaced from the inner end of said last named shoe and engageable therewith after the mechanism has been compressed to a predetermined extent to force said shoe toward said follower; a rubber block between said shoes, said block being under lateral compression between said shoes and under lengthwise compression between said inturned flange and the post of said follower; and spring means between said casing and follower yieldingly opposing relative movement of said casing and follower toward each other.

GEORGE E. DATH.

REFERENCES CITED

The following references are of record in the file of this patent:

UNITED STATES PATENTS

| Number | Name | Date |
| --- | --- | --- |
| 1,360,434 | O'Coonor | Nov. 30, 1920 |
| 2,220,074 | Blattner | Nov. 5, 1940 |
| 2,242,413 | Blattner | May 20, 1941 |
| 2,379,078 | Haseltine | June 26, 1945 |